United States Patent
Holtzman et al.

(10) Patent No.: US 6,999,430 B2
(45) Date of Patent: Feb. 14, 2006

(54) METHOD AND APPARATUS FOR TRANSMITTING DATA TRAFFIC ON A WIRELESS COMMUNICATION CHANNEL

(75) Inventors: Jack M. Holtzman, San Diego, CA (US); Sandip Sarkar, San Diego, CA (US); Ahmed Saifuddin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 685 days.

(21) Appl. No.: 09/727,925

(22) Filed: Nov. 30, 2000

(65) Prior Publication Data

US 2002/0089947 A1 Jul. 11, 2002

(51) Int. Cl.
H04L 12/26 (2006.01)
H04L 1/00 (2006.01)
H04J 1/16 (2006.01)
G06F 11/00 (2006.01)
G08C 15/00 (2006.01)

(52) U.S. Cl. ............... 370/328; 370/230; 370/474; 375/260; 455/441

(58) Field of Classification Search ......... 370/230–321, 370/328–349, 442–474; 375/141–147, 224–260, 375/130; 455/441–464, 509–527, 561–562
See application file for complete search history.

(56) References Cited

U.S. PATENT DOCUMENTS

| | | | | | |
|---|---|---|---|---|---|
| 4,645,599 A | * | 2/1987 | Fredkin | ............... | 210/416.1 |
| 4,970,714 A | * | 11/1990 | Chen et al. | ............... | 370/216 |
| 5,065,398 A | * | 11/1991 | Takashima | ............... | 370/230 |
| 5,222,061 A | * | 6/1993 | Doshi et al. | ............... | 370/394 |
| 5,448,751 A | | 9/1995 | Takenaka et al. | ............... | 455/33.1 |
| 5,742,592 A | * | 4/1998 | Scholefield et al. | ............... | 370/329 |
| 5,745,532 A | | 4/1998 | Campana, Jr. | ............... | 375/347 |
| 5,752,193 A | * | 5/1998 | Scholefield et al. | ............... | 455/452.2 |
| 5,901,144 A | | 5/1999 | Maki et al. | ............... | 370/330 |
| 6,021,124 A | * | 2/2000 | Haartsen | ............... | 370/336 |
| 6,084,865 A | | 7/2000 | Dent | ............... | 370/321 |
| 6,134,261 A | * | 10/2000 | Ryan | ............... | 375/141 |
| 6,396,867 B1 | * | 5/2002 | Tiedemann et al. | ............... | 375/141 |
| 6,545,986 B1 | * | 4/2003 | Stellakis | ............... | 370/318 |
| 6,625,172 B1 | * | 9/2003 | Odenwalder et al. | ............... | 370/474 |
| 6,657,980 B1 | * | 12/2003 | Holtzman et al. | ............... | 370/329 |
| 6,711,208 B1 | * | 3/2004 | Razoumov et al. | ............... | 375/224 |

FOREIGN PATENT DOCUMENTS

| | | |
|---|---|---|
| EP | 0377136 | 7/1990 |
| EP | 0797327 | 9/1997 |
| WO | 0072498 | 11/2000 |

OTHER PUBLICATIONS

Prosch, et al: "The Use of Big LEO Satellite Sustems and EUREKA 147 DAB to Provide Reliable BC Reception" IEEE Transactions on Broadcasting, vol. 43, No. 2: 185–190, Jun. 1997.

Watanabe, et al: "Bit Error Rate evaluation of Delay Time Control Scheme for Reverse Channel on Orthogonal Coding Multi–Carrier CDMA" IEICE Trans. Fundamentals, vol. E80–A, No. 7: 1226–1232, Jul. 1997.

Queseth, et al: "Algorithms for Link Adaptation in GPRS" Vehicular Technologies Conference, IEEE: 943–947, May 1999.

* cited by examiner

*Primary Examiner*—Man U. Phan
(74) *Attorney, Agent, or Firm*—Phillip R. Wadsworth; Thien T. Nguyen; Kam T. Tam

(57) ABSTRACT

Methods and apparatus are presented for scheduling data packet transmissions during optimal channel conditions. In one method, data packet retransmissions are scheduled for transmission during favorable channel conditions when the target remote station is moving slowly, but are scheduled for periodic transmissions when the target is moving moderately or fast. In another method, long delays for retransmissions in a channel sensitive timing scheme are eliminated. In other methods, a combination of periodic and aperiodic retransmissions are used to achieve the desired frame error rate.

8 Claims, 8 Drawing Sheets

METHOD AND APPARATUS FOR TRANSMITTING DATA TRAFFIC ON A WIRELESS COMMUNICATION CHANNEL

BACKGROUND

I. Field

The present invention relates to wireless voice and data communication systems. More particularly, the present invention relates to novel and improved methods and apparatus for transmitting data traffic on a communication channel.

II. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. (As used herein, the term "cellular" systems encompasses both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008 (often referred to collectively herein as IS-95), and proposed high-data-rate systems for data, etc. are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and fully incorporated herein by reference. In CDMA systems, over-the-air power control is a vital issue. An exemplary method of power control in a CDMA system is described in U.S. Pat. No. 5,056,109, which is assigned to the assignee of the present invention and fully incorporated herein by reference.

A primary benefit of using a CDMA over-the-air interface is that communications are conducted over the same radio frequency (RF) band. For example, each remote subscriber unit (e.g., a cellular telephone, personal digital assistant (PDA), laptop connected to a cellular telephone, hands-free car kit, etc.) in a given cellular telephone system can communicate with the same base station by transmitting a reverse-link signal over the same 1.25 MHz of RF spectrum. Similarly, each base station in such a system can communicate with remote units by transmitting a forward-link signal over another 1.25 MHz of RF spectrum.

Transmitting signals over the same RF spectrum provides various benefits including, e.g., an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a remote station from the coverage area of two or more base stations that involves simultaneously interfacing with two base stations. In contrast, hard handoff involves terminating the interface with a first base station before establishing the interface with a second base station. An exemplary method of performing soft handoff is described in U.S. Pat. No. 5,267,261, which is assigned to the assignee of the present invention and fully incorporated herein by reference.

In conventional cellular telephone systems, a public switched telephone network (PSTN) (typically a telephone company) and a mobile switching center (MSC) communicate with one or more base station controllers (BSCs) over standardized E1 and/or T1 telephone lines (hereinafter referred to as E1/T1 lines). The BSCs communicate with base station transceiver subsystems (BTSs) (also referred to as either base stations or cell sites), and with each other, over a backhaul comprising E1/T1 lines. The BTSs communicate with remote units via RF signals sent over the air.

To provide increased capacity, the International Telecommunications Union recently requested the submission of proposed methods for providing high-rate data and high-quality speech services over wireless communication channels. The submissions describe so-called "third generation," or "3G," systems. An exemplary proposal, the cdma2000 ITU-R Radio Transmission Technology (RTT) Candidate Submission (referred to herein as cdma2000), was issued by the TIA. The standard for cdma2000 is given in draft versions of IS-2000 and has been approved by the TIA. The cdma2000 proposal is compatible with IS-95 systems in many ways. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

Given the growing demand for wireless data applications, the need for very efficient wireless data communication systems has become increasingly significant. The IS-95, cdma2000, and WCDMA standards are capable of transmitting both data traffic and voice traffic over the forward and reverse links. A method for transmitting data traffic in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein.

A significant difference between voice traffic services and data traffic services is the fact that the former imposes stringent maximum delay requirements. Typically, the overall one-way delay of speech traffic frames must be less than 100 msec. In contrast, the delay of data traffic frames can be permitted to vary in order to optimize the efficiency of the data communication system. Specifically, more efficient error correcting coding techniques, which require significantly larger delays than those that can be tolerated by voice traffic services, can be utilized. An exemplary efficient coding scheme for data is disclosed in U.S. Pat. No. 5,933,462, entitled "SOFT DECISION OUTPUT DECODER FOR DECODING CONVOLUTIONALLY ENCODED CODEWORDS," filed Nov. 6, 1996, assigned to the assignee of the present invention and incorporated by reference herein.

Another significant difference between voice traffic and data traffic is that voice traffic requires a fixed and common grade of service (GOS) for all users. Typically, for digital systems providing voice traffic services, this translates into a fixed and equal transmission rate for all users and a maximum tolerable error rate for the speech traffic frames. In contrast, because of the availability of retransmission protocols for data traffic services, the GOS can be different from user to user and can be varied in order to increase the overall efficiency of the data communication system. The GOS of a data traffic communication system is typically defined as the total delay incurred in the transfer of a predetermined amount of data.

Various protocols exist for transmitting packetized traffic over packet-switching networks so that information arrives at its intended destination. One such protocol is "The Internet Protocol," RFC 791 (September, 1981). The internet protocol (IP) breaks up messages into packets, routes the packets from a sender to a destination, and reassembles the packets into the original messages at the destination. The IP protocol requires that each data packet begins with an IP header containing source and destination address fields that uniquely identifies host and destination computers. The transmission control protocol (TCP), promulgated in RFC 793 (September, 1981), is responsible for the reliable, in-order delivery of data from one application to another. The User Datagram Protocol (UDP) is a simpler protocol that is useful when the reliability mechanisms of TCP are not necessary. For voice traffic services over IP, the reliability mechanisms of TCP are not necessary because retransmission of voice packets is ineffective due to delay constraints. Hence, UDP is usually used to transmit voice traffic.

CDMA systems use pilot channels and multiple traffic channels to carry voice and data services to subscribers. In order to optimize system performance on the reverse link between remote station and base station, pilot channel energies and traffic channel energies are balanced. However, no balancing of channel energies on the forward link occurs since the base station transmits at a maximum power level appropriate to service all remote stations residing within the designated range of the base station.

Due to the demand for transmitting voice traffic and data traffic on a single carrier channel, there is a present need to develop optimal transmission strategies for the forward link.

SUMMARY

Novel and improved methods and apparatus for transmitting data traffic on a single channel are presented. A channel, as used herein, refers to at least a portion of the frequency bandwidth assigned to a wireless communication service provider. In the embodiments described below, the channel may be dedicated to both voice traffic and data traffic or the channel may be dedicated solely to data traffic.

In one aspect, a method is presented for transmitting data in a channel of a wireless communication system, comprising: packaging a data payload into a plurality of subpackets; sequentially transmitting a first portion of the plurality of subpackets in accordance with predetermined delays; and sequentially transmitting a second portion of the plurality of subpackets in accordance with channel conditions.

In another aspect, a method is presented for transmitting data in a channel of a wireless communication system, comprising: packaging a data payload into a plurality of subpackets; sequentially transmitting a first portion of the plurality of subpackets in accordance with channel conditions; and sequentially transmitting a second portion of the plurality of subpackets in accordance with predetermined delays.

In another aspect, a method is presented for transmitting data in a channel of a wireless communication system, comprising: packaging a data payload into a plurality of subpackets, wherein the data payload is destined for a remote station; performing a velocity determination of the remote station; if the velocity of the remote station is slow or stationary, then transmitting the plurality of subpackets sequentially in accordance with channel conditions; if the velocity of the remote station is not slow nor stationary, then transmitting the plurality of subpackets sequentially in accordance with predetermined delays; and updating the velocity determination of the remote station; if the updated velocity of the remote station indicates a change from slow or stationary, then transmitting a remaining portion of the plurality of subpackets in accordance with predetermined delays; if the updated velocity of the remote station indicates a change from not slow nor stationary, then transmitting a remaining portion of the plurality of subpackets in accordance with channel conditions.

In another aspect, a method is presented for transmitting data in a channel of a wireless communication system, comprising: repackaging a data payload into a plurality of redundant subpackets; transmitting a first subpacket to a remote station, wherein the first subpacket includes a preamble; if an acknowledgement message is not received, transmitting a second subpacket at a predetermined time delay to the remote station, wherein the second subpacket does not include a preamble; and if an acknowledgement message for the second subpacket is not received, transmitting a remaining portion of the plurality of redundant subpackets in accordance with channel conditions until an acknowledgement message is received, wherein each of the remaining portion of the plurality of redundant subpackets includes a preamble.

In another aspect, a method is presented for transmitting data in a channel of a wireless communication system, comprising: packaging a data payload into a plurality of subpackets; transmitting a first subpacket to a remote station; if the channel conditions are optimal, transmitting a remaining portion of the plurality of subpackets to the remote station; and if the channel conditions are not optimal within a predetermined time duration, then transmitting a remaining portion of the plurality of subpackets during unfavorable channel conditions. In one aspect of this embodiment, the step of transmitting the remaining portion of the plurality of subpackets if the channel conditions are not optimal is given a higher priority than a new transmission to a second remote station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
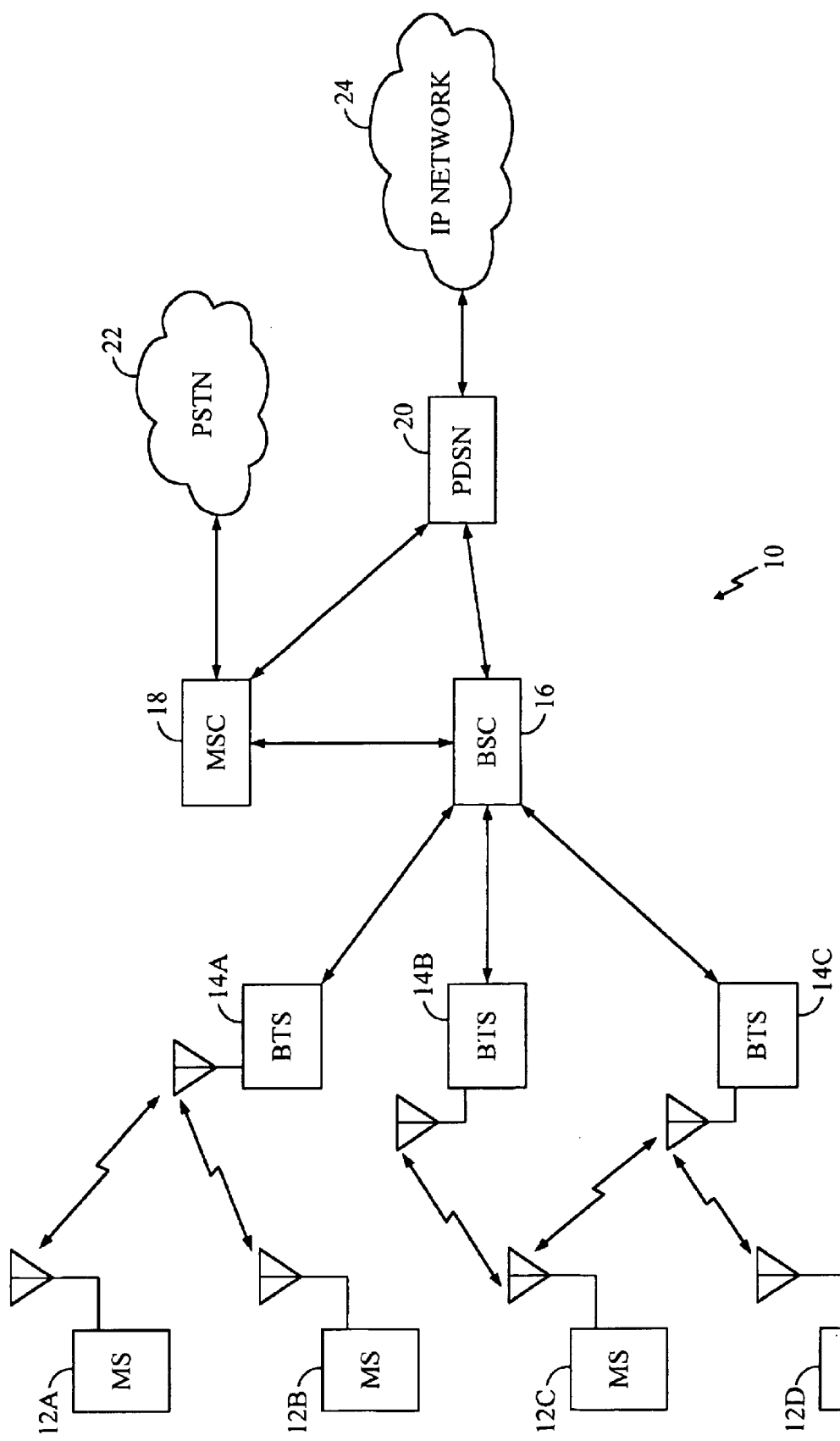
FIG. 1 is a diagram of an exemplary data communication system.

As illustrated in FIG. 1, a wireless communication network 10 generally includes a plurality of mobile stations or remote subscriber units 12a–12d, a plurality of base stations 14a–14c, a base station controller (BSC) or packet control function 16, a mobile station controller (MSC) or switch 18, a packet data serving node (PDSN) or internetworking function (IWF) 20, a public switched telephone network (PSTN) 22 (typically a telephone company), and an Internet Protocol (IP) network 26 (typically the Internet). For purposes of simplicity, four remote stations 12a–12d, three base stations 14a–14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment, the wireless communication network 10 is a packet data services network. The remote stations 12a–12d may be cellular telephones, cellular telephones connected to laptop computers running IP-based, Web-browser applications, cellular telephones with associated hands-free car kits, or PDAs running IP-based, Web-browser applications. The remote stations 12a–12d may advantageously be configured to perform one or more wireless packet data protocols such as described in, e.g., the EIA/TIA/IS-707 standard. In a particular embodiment, the remote stations 12a–12d generate IP packets destined for the IP network 24 and encapsulate the IP packets into frames using a point-to-point protocol (PPP).

In one embodiment, the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20. In one embodiment the remote stations 12a–12d communicate with the base stations 14a–14c over an RF interface defined in $3^{rd}$ Generation Partnership Project 2 "3GPP2", "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14a–14c receive and demodulate sets of reverse-link signals from various remote stations 12a–12d engaged in telephone calls, Web browsing, or other data communications. Each reverse-link signal received by a given base station 14a–14c is processed within that base station 14a–14c. Each base station 14a–14c may communicate with a plurality of remote stations 12a–12d by modulating and transmitting sets of forward-link signals to the remote stations 12a–12d. For example, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a–12d from one base station 14a–14c to another base station 14a–14c. For example, a remote station 12c is communicating with two base stations 14b, 14c simultaneously. Eventually, when the remote station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

Reverse channels are transmissions from remote stations 12a–12d to base stations 14a–14c. Performance of reverse link transmissions can be measured as a ratio between the energy levels of the pilot channel and other reverse traffic channels. A pilot channel accompanies the traffic channels in order to provide coherent demodulation of the received traffic channels. In the cdma2000 system, the reverse traffic channels can comprise multiple channels, including but not limited to an Access Channel, an Enhanced Access Channel, a Reverse Common Control Channel, a Reverse Dedicated Control Channel, a Reverse Fundamental Channel, a Reverse Supplemental Channel, and a Reverse Supplemental Code Channel, as specified by radio configurations of each individual subscriber network using cdma2000.

Although the signals transmitted by different remote stations within the range of a base station are not orthogonal, the different channels transmitted by a given remote station are mutually orthogonal by the use of orthogonal Walsh Codes. Each channel is first spread using a Walsh code, which provides for channelization and for resistance to phase errors in the receiver.

As mentioned previously, power control is a vital issue in CDMA systems. In a typical CDMA system, a base station punctures power control bits into transmissions transmitted to each remote station within the range of the base station. Using the power control bits, a remote station can advantageously adjust the signal strength of its transmissions so that power consumption and interference with other remote stations may be reduced. In this manner, the power of each individual remote station in the range of a base station is approximately the same, which allows for maximum system capacity. The remote stations are provided with at least two means for output power adjustment. One is an open loop power control process performed by the remote station and another is a closed loop correction process involving both the remote station and the base station.

However, on the forward link, a base station can transmit at a maximum power transmission level to all remote stations within the range of the base station because the issue of interference between remote stations within the same cell does not arise. This capability can be exploited to design a system that can carry both voice traffic and data traffic. It should be noted that the maximum power transmission level cannot be so high as to interfere with the operation of neighboring base stations.

In a system using variable rate encoding and decoding of voice traffic, a base station will not transmit voice traffic at a constant power level. The use of variable rate encoding and decoding converts speech characteristics into voice frames that are optimally encoded at variable rates. In an exemplary CDMA system, these rates are full rate, half rate, quarter rate, and eighth rate. These encoded voice frames can then be transmitted at different power levels, which will achieve a desired target frame error rate (FER) if the system is designed correctly. For example, if the data rate is less than the maximum data rate capacity of the system, data bits can be packed into a frame redundantly. If such a redundant packing occurs, power consumption and interference to other remote stations may be reduced because the process of soft combining at the receiver allows the recovery of corrupted bits. The use of variable rate encoding and decoding is described in detail in U.S. Pat. No. 5,414,796, entitled "VARIABLE RATE VOCODER," assigned to the assignee of the present invention and incorporated by reference herein. Since the transmission of voice traffic frames does not necessarily utilize the maximum power levels at which the base station may transmit, packetized data traffic can be transmitted using the residual power.

Hence, if a voice frame is transmitted at a given instant x(t) at X dB but the base station has a maximum transmission capacity of Y dB, then there is (Y−X) dB residual power that can be used to transmit data traffic.

The process of transmitting data traffic with voice traffic can be problematic. Since the voice traffic frames are transmitted at different transmission power levels, the quantity (Y−X) db is unpredictable. One method for dealing with this uncertainty is to repackage data traffic payloads into repetitious and redundant subpackets. Through the process of soft combining, wherein one corrupted subpacket is combined with another corrupted subpacket, the transmission of repetitious and redundant subpackets can produce optimal data transmission rates. For illustrative purposes only, the nomenclature of the cdma2000 system is used herein. Such use is not intended to limit the implementation of the invention to cdma2000 systems. In a cdma2000 system, data traffic is divided into packets, which are composed of subpackets, which occupy slots.

For example, if a remote station requests the transmission of data at 76.8 kbps, but the base station knows that this transmission rate is not possible at the requested time, due to the location of the remote station and the amount of residual power available, the base station can package the data into multiple subpackets, which are transmitted at the lower available residual power level. The remote station will receive the data subpackets with corrupted bits, but can soft combine the uncorrupted bits of the subpackets to receive the data payload within an acceptable FER.

This methodology is problematic in that the remote station must be able to detect and decode the additional subpackets. Since the additional subpackets carry redundant data payload bits, the transmission of these additional subpackets will be referred to alternatively as "retransmissions."

One method that will allow a remote station to detect the retransmissions is to send such retransmissions at periodic intervals. In this method, a preamble is attached to the first transmitted subpacket, wherein the preamble carries information identifying which remote station is the target destination of the data payload, the transmission rate of the subpacket, and the number of subpackets used to carry the full amount of data payload. The timing of the arrival of subpackets, i.e., the periodic intervals at which retransmissions are scheduled to arrive, is usually a predefined system parameter, but if a system does not have such a system parameter, timing information may also be included in the preamble. Other information, such as the RLP sequence numbers of the data packet, can also be included. Since the remote station is on notice that future transmissions will arrive at specific times, such future transmissions need not include preamble bits.

Rayleigh fading, also known as multipath interference, occurs when multiple copies of the same signal arrive at the receiver in destructive manner. Substantial multipath interference can occur to produce flat fading of the entire frequency bandwidth. If the remote station is travelling in a rapidly changing environment, deep fades could occur at times when subpackets are scheduled for retransmission. When such a circumstance occurs, the base station requires additional transmission power to transmit the subpacket. This can be problematic if the residual power level is insufficient for retransmitting the subpacket.

Figure 2:
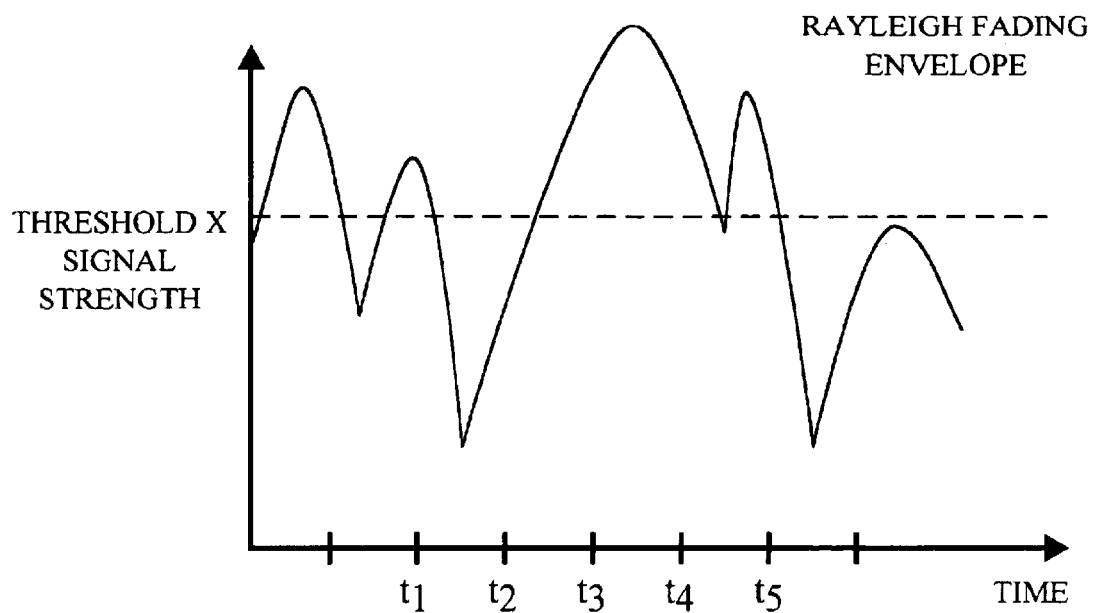
FIG. 2 is a graph illustrating periodic transmissions of data traffic packets.

FIG. 2 illustrates a plot of signal strength versus time, wherein periodic transmissions occur at times $t_1$, $t_2$, $t_3$, $t_4$, and $t_5$. At time $t_2$, the channel fades, so the transmission power level must be increased in order to achieve a low FER.

Another method that will allow a remote station to detect the retransmissions is to attach a preamble to every transmitted subpacket, and to then send the subpackets during optimal channel conditions. Optimal channel conditions can be determined at a base station through information transmitted by a remote station. Optimal channel conditions can be determined through channel state information carried by data request messages (DRC) or by power strength measurement messages (PSMM) that are transmitted by a remote station to the base station during the course of operations. Channel state information can be transmitted by a variety of ways, which are not the subject of the present application. Such methods are described in U.S. Pat. No. 6,377,809, filed on Sep. 16, 1997, entitled, "CHANNEL STRUCTURE FOR COMMUNICATION SYSTEMS," assigned to the assignee of the present invention and incorporated by reference herein. One measure of an optimal channel condition is the amount of interference due to other remote stations. Another measure of an optimal channel condition is the Rayleigh fading condition.

The method of transmitting only during favorable channel conditions is ideal for channels that do not have predefined timing intervals for transmissions. In the exemplary embodiment, a base station only transmits at the peaks of a Rayleigh fading envelope, wherein signal strength is plotted against time and the signal strength peaks are identified by a predetermined threshold value. If such a method is implemented, then an easily detectable and decodable preamble is vital for retransmissions.

Figure 3:
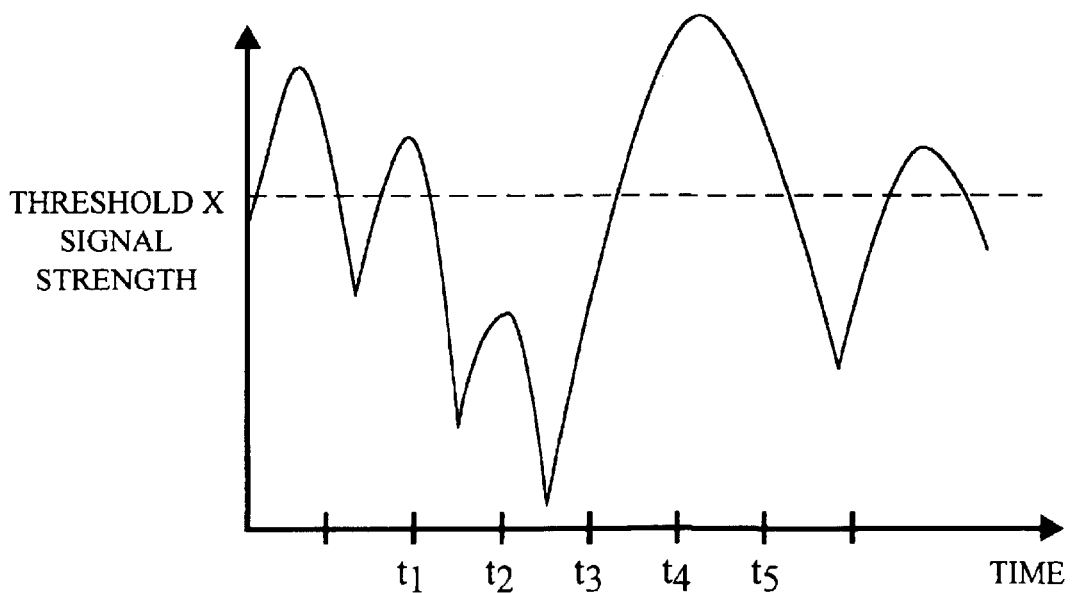
FIG. 3 is a graph illustrating transmission of data traffic packets during optimal transmission conditions.

FIG. 3 illustrates a plot of signal strength versus time. If the base station determines that the signal strength to a remote station is good at times $t_1$, $t_4$, and $t_5$, but not at times $t_2$ and $t_3$ because the signal strength is not above threshold x, then the base station will only transmit at times $t_1$, $t_4$, and $t_5$.

Since the decoding of retransmissions is dependent upon the preambles attached thereto, the preambles may need to be transmitted at a higher power level than the rest of the subpacket or may need to be structured so that it is more easily detectable and/or decodable. A method for structuring preambles is described in U.S. Publication No. 2000/0097780, filed on Nov. 30, 2002, entitled "PREAMBLE GENERATION."

However, preamble bits are overhead bits that use transmission power that could otherwise be used to carry data traffic. For example, suppose that a preamble is K bits long, the data payload is divided into M subpackets, and the total number of bits for all subpackets is N. Then a periodic transmission that requires only one preamble will have an overhead of K/N bits and the amount of energy to transmit this overhead is $10\log_{10}$ (K/N). However, for aperiodic transmissions that require a preamble for each subpacket, the overhead is MK/N and the amount of energy to transmit this overhead is $10\log_{10}$(MK/N).

The exemplary embodiments described herein exploit the benefits of the two methods above while minimizing the negative aspects of the methods. Although these embodiments are described in the context of a channel carrying both voice and data traffic, the methodologies detailed herein can also be applied to any data traffic channel wherein retransmissions of corrupted data packets occur.

Figure 4:
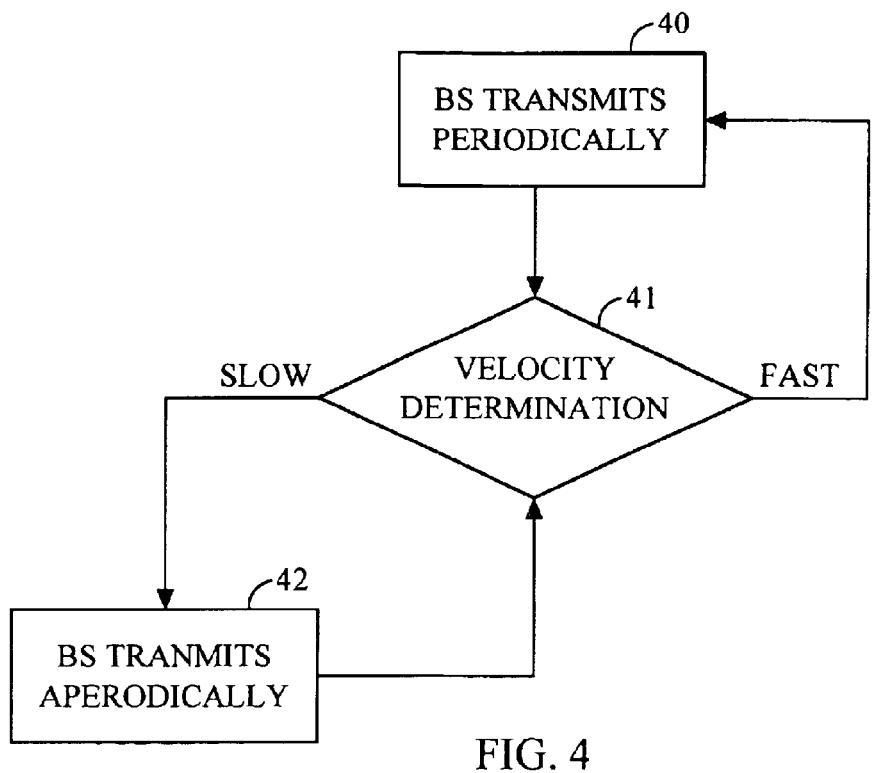
FIG. 4 is a flowchart of an exemplary embodiment, wherein the velocity of a remote station is used as a criterion for a transmission timing decision.

FIG. 4 is a flowchart of a first exemplary embodiment, wherein velocity estimates of a remote station are used to determine the timing of the forward link transmission of data traffic packets.

In one aspect of the first exemplary embodiment, a velocity estimation scheme, as described in U.S. Pat. No. 6,564,042, entitled, "VELOCITY ESTIMATION BASED GAIN TABLES," filed on Mar. 3, 2000, and incorporated by reference herein and assigned to the assignee of the present invention, can be used to determine the velocity of the remote station. A general observation is that during instances of fast fading conditions, the received pilot power will cross a given power level threshold faster. The envelope level crossing rate (LCR) is defined as the average number of positive crossings across a predetermined level, R, per second. In one implementation of the embodiment, the level crossing velocity estimation technique is applied to either the in-phase (I) component or the quadrature (Q) component of the signal using a zero crossing rate (ZCR).

Let $\lambda_c$ be the carrier wavelength, then:

$$\hat{v}_{LCR} \approx \frac{\lambda_c \hat{L}_{R_{RMS}} e}{\sqrt{2\pi}},$$

$$\hat{v}_{ZCR} \approx \frac{\lambda_c \hat{L}_{ZCR}}{\sqrt{2}},$$

in which $\hat{L}_{R_{RMS}}$ is the number of level crossings per second, $\hat{L}_{ZCR}$ is the number of zero crossings (times the signal crosses zero), and e is the constant that is the base for the natural logarithm (ln). Then $\hat{v}_{LCR}$ is the estimated velocity using level crossings and $\hat{v}_{ZCR}$ is the estimated velocity using zero crossings.

In another method for velocity estimation, the velocity of the remote station can be determined through covariance estimation. An estimate is made of the auto-covariance between faded samples r[i]. The faded samples r[i] may be the envelope samples, the squared-envelope samples, or the log-envelope samples. The value $\tau_t$ is defined as the samples spacing in units of seconds per sample. The value $\mu_{rr}(0)$ is defined as the energy of the received signal r[k] ($\mu_{rr}(k)$ being the covariance). For the squared envelope, the velocity of the remote station may be estimated in accordance with the following equation:

$$\hat{v}_{COV} \approx \frac{\lambda_C}{2\pi\tau_t}\sqrt{\frac{\overline{V}}{\mu_{rr}(0)}},$$

where $$V = \frac{1}{N}\sum_{k=1}^{N}(r[k+\tau_t]-r[k])^2,$$

k is the sample index, N is a moving window size, and $\overline{V}$ is an average value of V. The signal energy, $\mu_{rr}(0)$, may be estimated in accordance with a number of methods known to those of skill in the art.

In another method for velocity estimation, the velocity of the remote station can be determined through Doppler frequency estimation, which is proportional to the velocity of the remote station. Doppler estimation can also be performed using knowledge of the transmitted power control bits, at either the remote station or the base station.

In another method for velocity estimation, the power control bits are advantageously used to estimate the channel conditions. Through observation, it is determined that power control bits are received by the remote station with a 4% error rate. Hence the transmission power levels of the remote station and the transmission power levels indicated by the actual power control bits so not substantially differ by a large percent. This information indicates that it is reasonable to make a transmission power level estimate either by using a number of power control bits received by the remote station or by using a number of power control bits transmitted by the base station.

Knowledge of the cumulative sum of the power control bits can be used by the base station or the remote station to determine the average power of the remote station's transmissions, which can in turn be used to determine the velocity of the remote station. The power levels of the received signals are used to determine the envelope level crossing rate (LCR), excursion times, and excursion depths. This determination is made through direct observation of the number of positive going crossings per second made by the transmitted power control bits. In turn, the level crossing rate and the excursion time can be used to determine velocity information. It should be noted that the profile of the envelope LCR is similar to the transmit power profile of the remote station. In an embodiment, the power profile of the remote station, which is composed of 1 dB incremental steps, may be replaced by the profile of the envelope LCR, which can be smoothed by taking a geometric mean of successive powers of the received waveform energy per PCG and curve fitting the values.

Other methods for determining a velocity of the remote station can be implemented within the scope of the first exemplary embodiment described in FIG. 4.

At step 40 of FIG. 4, a base station is periodically transmitting subpackets carrying data traffic payload to remote stations operating within the range of the base station. It should be noted that since the transmissions are periodic, only the first subpacket of a plurality of subpackets carrying a specific data load needs to include a preamble, wherein the preamble provides notice to a remote station that retransmissions will be arriving at a predetermined time period.

At step 41, a processing element in the base station determines that at least one remote station is stationary or travelling at a slow speed. A slow speed can be designated 20 kilometers per hour or less, however, it should be noted that this threshold value is merely a representative figure that will vary with individual system requirements. As used in this embodiment, the velocity may be determined by the remote station or the velocity may be determined by the base station. If the determination of velocity is performed by the remote station, then a transmission carrying the velocity information is sent from the remote station to the base station.

Figure 5:
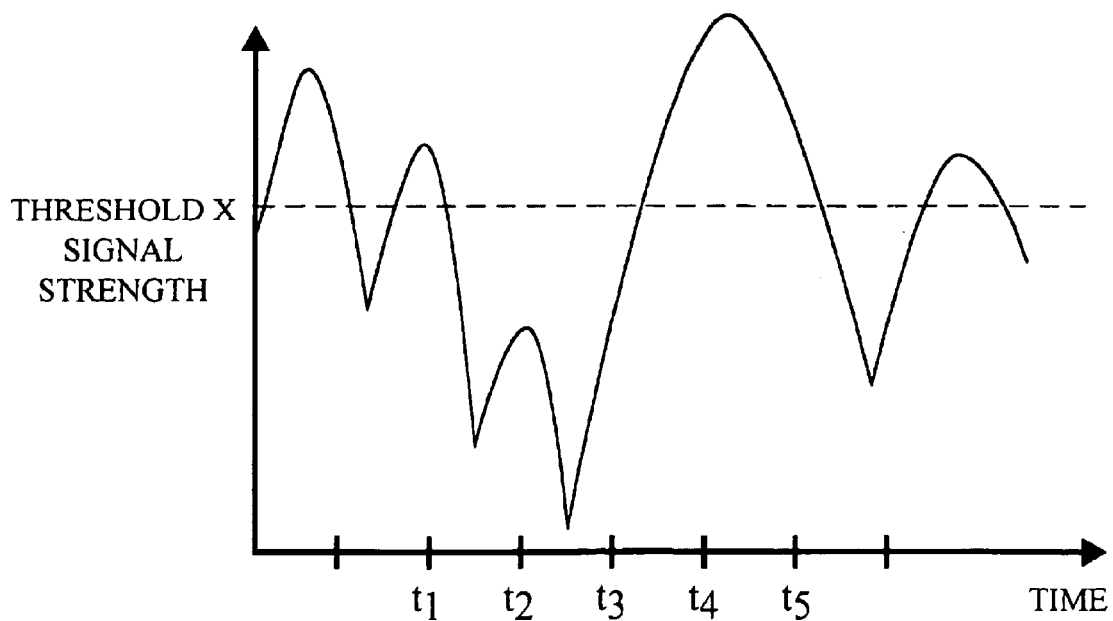
FIG. 5 is a graph illustrating transmissions of data traffic packets to multiple remote stations with normalized means.

At step 42, the base station discontinues periodic transmissions of data traffic packets to the "slow" remote station and begins transmitting aperiodically, during optimal channel conditions. In one aspect of the embodiment, optimality of the channel is determined by fading conditions on the channel. In such an instance, transmissions occur at times when the Rayleigh fading condition is above a set threshold. The set threshold is chosen as a normalized mean of the fading characteristics of the channel. FIG. 5 is a graph illustrating the transmission of packets carrying data traffic payload at points $t_1$, $t_4$, and $t_5$ above a set threshold of x dB. Each subpacket transmitted during this step includes preamble bits.

Velocity updates are performed so that the timing if the retransmissions may be periodic or aperiodic in accordance with the speed of the remote station.

It should be noted that the exemplary embodiment may be implemented with the base station starting with the step of transmitting in a channel sensitive manner, wherein transmissions occur only during optimal or favorable channel conditions. If the velocity of the remote station is determined to be moderate or fast, the base station will start transmitting subpackets periodically.

At any point during the process outlined above, if an ACK has been received from a remote station, then retransmissions to that remote station cease and the remaining redundant subpackets are discarded.

Figure 6:
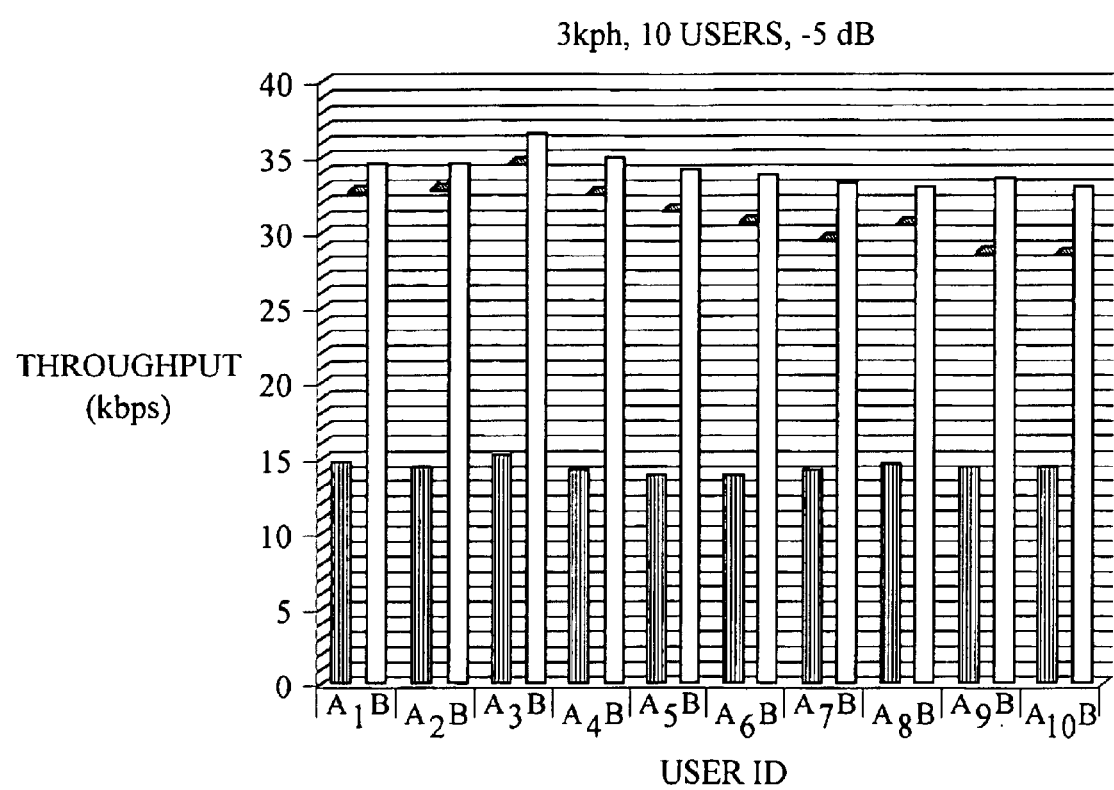
FIG. 6 is a graph illustrating the improvement in the data throughput rate of remote stations at slow speeds.

FIG. 6 is a graph illustrating the improvement in data throughput for 10 remote stations travelling at a slow speed and subject to the first exemplary embodiment. Bars 1a, 2a, 3a, 4a, 5a, 6a, 7a, 8a, 9a, and 10a indicate the average data throughput of 15 kbps without the implementation of the first exemplary embodiment. Bars 1b, 2b, 3b, 4b, 5b, 6b, 7b, 8b, 9b, and 10b indicate the average data throughput of 35 kbps using the first exemplary embodiment. As shown, the data throughput rate is doubled for the remote stations with the use of the first exemplary embodiment.

Figure 7:
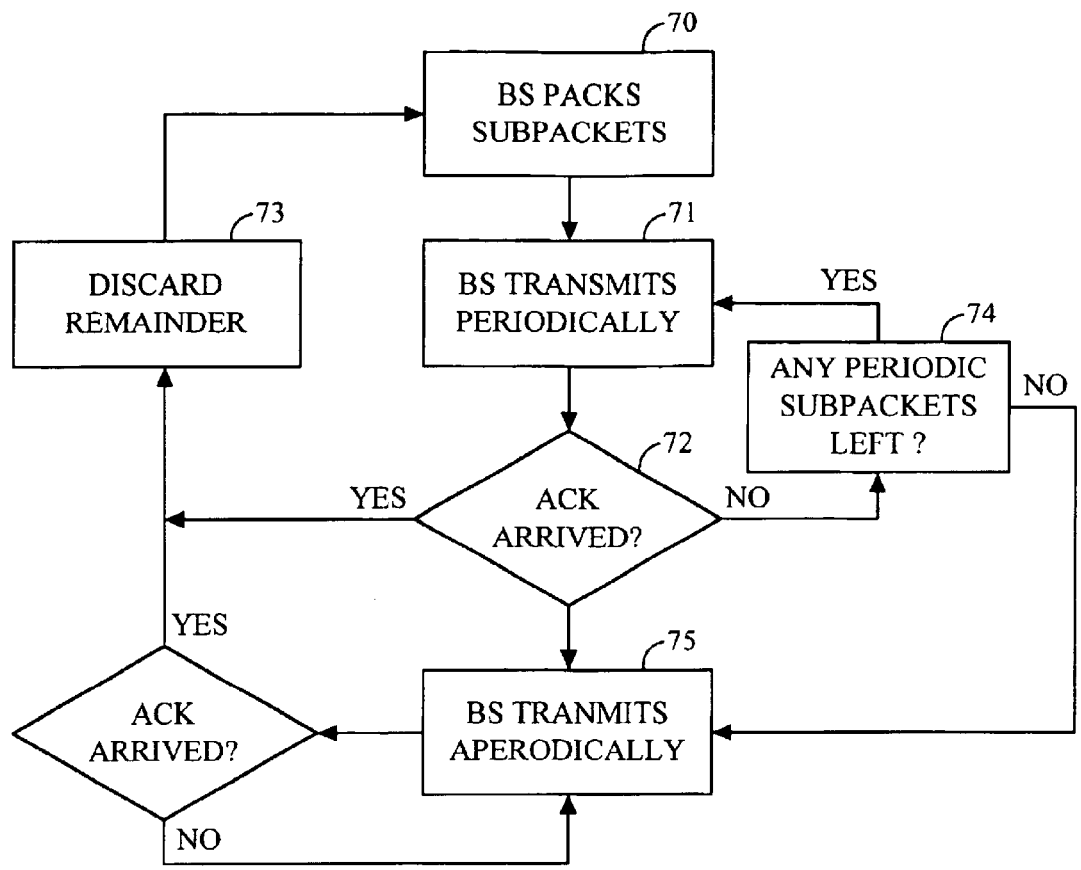
FIG. 7 is flowchart of an exemplary embodiment, wherein the transmission timing is periodic for a predetermined duration and then becomes aperiodic.

FIG. 7 illustrates a second exemplary embodiment for transmitting data traffic and voice traffic together on a single channel. Alternatively, this embodiment may be used for transmitting data on a designated data channel. Using the embodiment described herein, a base station may transmit data traffic payload to multiple remote stations using residual power levels. However, for illustrative purposes only, the method is described using only one base station and one remote station. In the second exemplary embodiment, the subpackets carrying the data payload is divided into a first portion and a second portion by a scheduler unit. The first portion of subpackets is sent with a constant delay between transmissions, and the second portion of subpackets is sent only during favorable channel conditions.

At step 70, a scheduler unit in a base station has received data traffic for transmission to a remote station. In accordance with efficient data coding schemes such as the one described in U.S. Pat. No. 5,933,462, the data payload is redundantly packed into a plurality of subpackets, which are sequentially transmitted to a remote station. Redundancy refers to the substantially similar data payload carried by each subpacket. It should be noted that power control bits are punctured into the subpackets at intervals without regard to subpacket content, so that the resulting punctured subpackets may not be identical to each other.

At step 71, the scheduler unit controls the transmission of a first portion of the subpackets to a remote station, wherein each of the subpackets are transmitted with a predetermined delay between each subpacket. An example of a predetermined delay is 3 slot cycles, wherein each slot is 1.25 ms long. The first subpacket contains preamble bits attached to the data subpacket, wherein the remote station is noticed that K further subpackets will arrive at the predetermined time intervals.

At step 72, the scheduler unit waits for an ACK or an NACK from the remote station. At step 73, an ACK arrives and the scheduler unit discards the remaining subpackets carrying redundant data payload. No further action is necessary.

If an ACK has not arrived at step 72, then the scheduler unit decides at step 74 whether any further subpackets that are to be sent periodically remains. If none remain, then the scheduler unit begins transmission of the channel sensitive portion of the subpackets at step 75. Since the remote station has no way of determining when a subpacket addressed to the remote station will arrive, a preamble must be attached to each subpacket, with the addressing information for the remote station.

Figure 8:
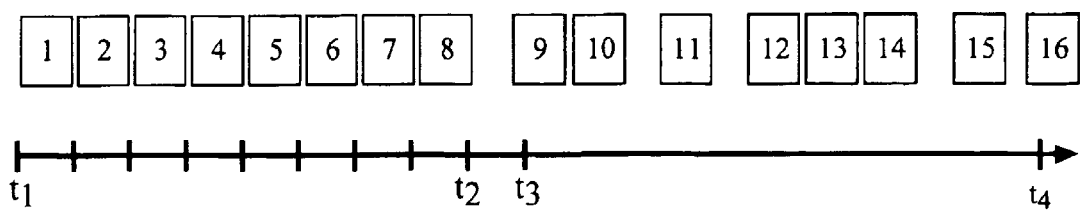
FIG. 8 is a diagram illustrating an example of the second exemplary embodiment.

FIG. 8 is a diagram of an example transmission and retransmission pattern time $t_1$ to time $t_4$. Data traffic payload is packed into 16 subpackets, wherein each subpacket is redundantly packed with the data traffic payload or a portion of the data traffic payload. It should be noted that the number of subpackets is for illustrative purposes only, and may vary in accordance with system requirements. At time $t_1$, the base station starts transmitting 8 subpackets on the forward link, with predetermined time durations between each subpacket. At time $t_2$, a NACK is received. At time $t_3$, the base station transmits the remaining 8 subpackets in accordance with optimal channel conditions, so that the time delay between retransmissions vary.

Figure 9:
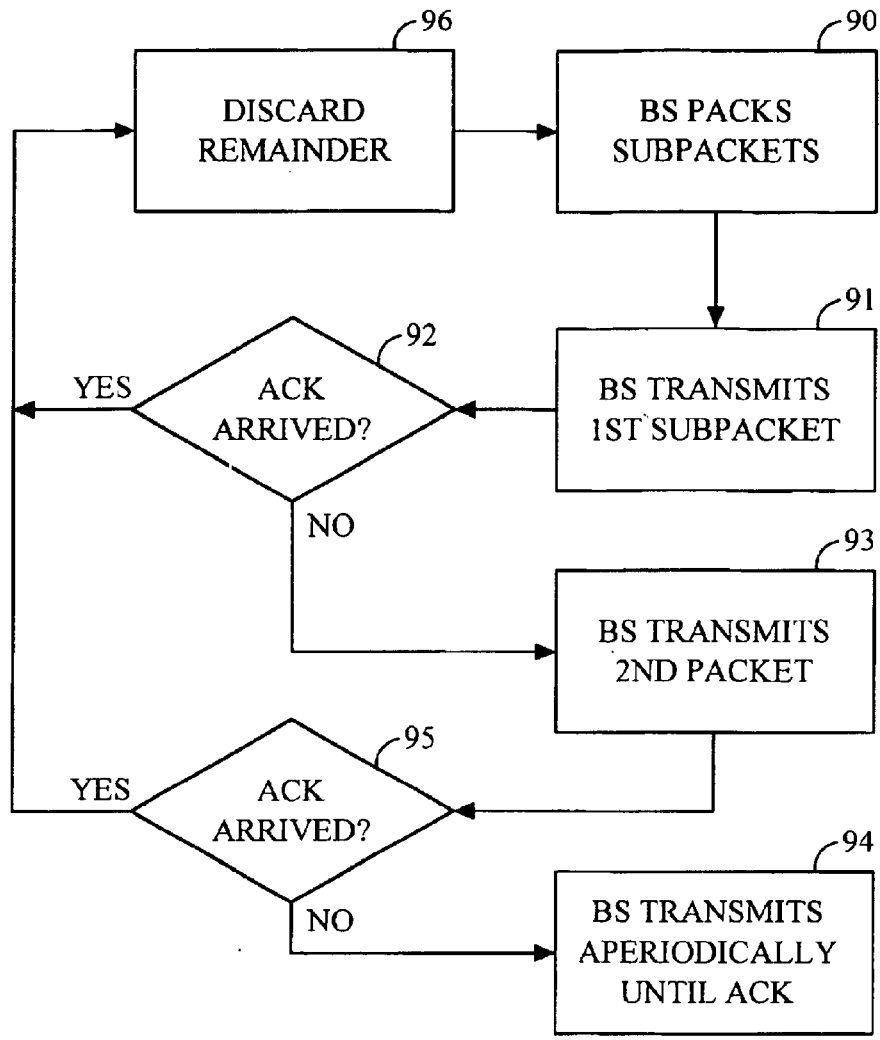
FIG. 9 is a flowchart of an exemplary embodiment, wherein a retransmission occurs after a fixed delay, and further retransmissions occur using channel sensitive timing schemes.

FIG. 9 illustrates a third exemplary embodiment of transmitting data traffic. In the third exemplary embodiment, only one retransmission occurs after a predetermined delay, and the remaining redundant subpackets are sent sequentially during favorable channel conditions. At step 90, a scheduler in a base station receives data traffic for transmission to a remote station, which is then packed redundantly into subpackets. At step 91, the scheduler transmits a first subpacket and waits for an ACK. If an ACK is not received after a predetermined duration, a second subpacket is transmitted at step 93. If an ACK is not received at step 95, which acknowledges the accurate decoding of the data traffic payload contained in the two subpackets, the scheduler begins transmitting the remaining subpackets in a channel sensitive manner at step 94. At any time during the retransmission process, the scheduler will end retransmissions upon receipt of an ACK and discard the remaining subpackets at step 96.

Figure 10:
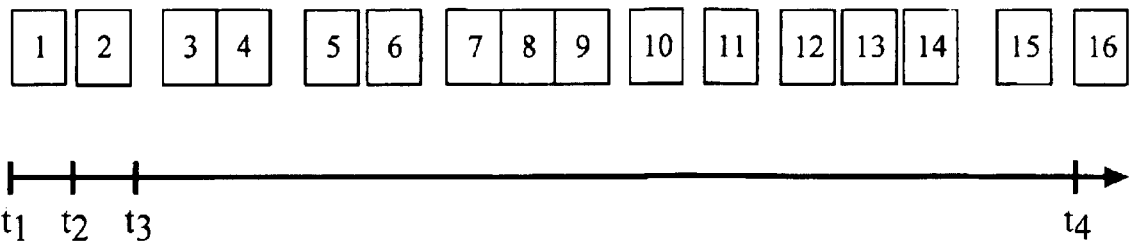
FIG. 10 is a diagram illustrating an example of the third exemplary embodiment.

FIG. 10 is a diagram of the transmitted data payload from time $t_1$ to time $t_4$. Data traffic payload is packed into 16 subpackets, wherein each subpacket is redundantly packed with the data traffic payload or a portion of the data traffic payload. It should be noted that the number of subpackets is for illustrative purposes only, and may vary in accordance with system requirements. At time $t_1$, the base station transmits one subpacket. At time $t_2$, no ACK as been received, so the base station transmits a second subpacket. At time $t_3$, no ACK as been received, so the base station starts transmitting the remaining subpackets in a channel sensitive manner, wherein the remote station is unaware of the time of arrival of the remaining subpackets.

Figure 11:
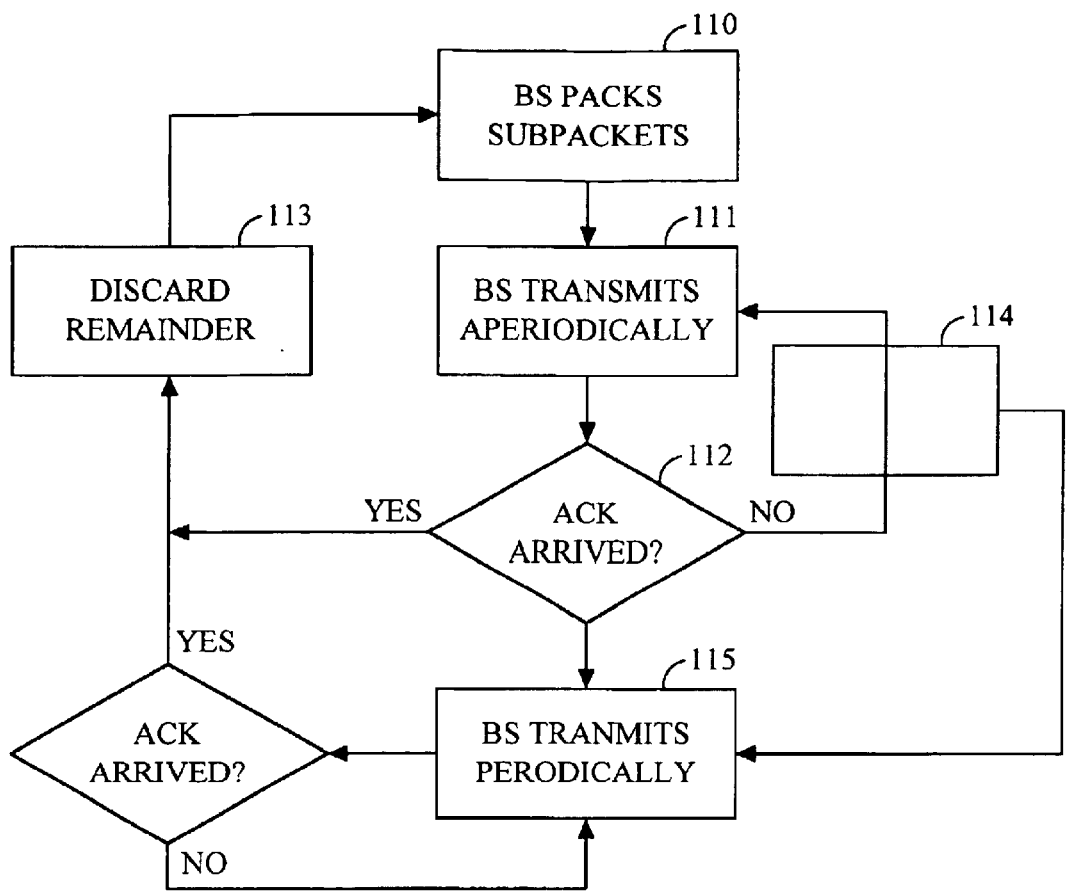
FIG. 11 is a flowchart of an exemplary embodiment, wherein a plurality of retransmissions occurs in accordance with a channel sensitive timing scheme for a predetermined duration, and further retransmissions occur periodically.

FIG. 11 illustrates a fourth exemplary embodiment, wherein the data traffic is transmitted in both a channel sensitive manner and a channel insensitive manner. In the fourth exemplary embodiment, the subpackets carrying the data payload is divided into a first portion and a second portion by a scheduler unit. The first portion of subpackets is sent during favorable channel conditions, and the second portion is sent with a constant delay between transmissions.

At step 110, a base station has received data traffic for transmission to a remote station. In accordance with efficient data coding schemes such as the one described in U.S. Pat. No. 5,933,462, the data payload is redundantly packed into a plurality of subpackets, which are sequentially transmitted to a remote station.

At step 111, a scheduler in a base station begins transmitting a first portion of the subpackets to a remote station in a channel sensitive manner. Since the remote station has no way of determining when a subpacket addressed to the remote station will arrive, a preamble must be attached to each subpacket, with the addressing information for the remote station.

At step 112, the scheduler waits for an ACK or an NACK from the remote station. At step 113, an ACK arrives and the scheduler discards the remaining subpackets carrying redundant data payload. No further action is necessary.

If an ACK has not arrived at step 112, then the scheduler decides at step 114 whether any further subpackets that are to be sent aperiodically remains. If none remain, then the base station begins transmission of the periodic, second portion of the subpackets at step 115. Each of the subpackets are transmitted with a predetermined delay between each subpacket. An example of a predetermined delay is 3 slot cycles, wherein each slot is 1.25 ms long. The first subpacket contains preamble bits attached to the data subpacket, wherein the remote station is noticed that K further subpackets will arrive at the predetermined time intervals.

In a fifth exemplary embodiment, the data traffic payload is divided into larger sized subpackets for transmission purposes. For example, rather than transmitting 16 subpackets, 8 subpackets are formed. The smaller number of subpackets can then be transmitted in a manner as described by the other exemplary embodiments.

Figure 12:
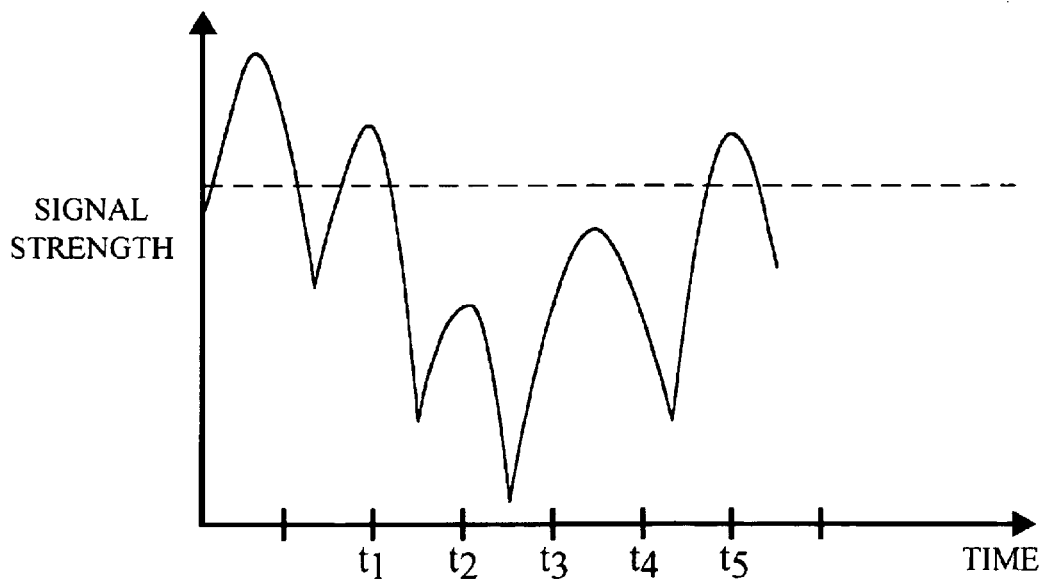
FIG. 12 is a diagram illustrating potential transmission delays when using channel sensitive timing schemes.

FIG. 12 illustrates a problem with channel sensitive retransmission schemes. In some circumstances, wherein deep fades may occur, an optimal time for retransmissions may not occur within a timely period. For example, at time $t_1$, the base station uses channel state information to determine that transmission conditions are optimal. If the remote station enters into a region wherein deep fading occurs for a long period, the next optimal time for retransmissions could occur at $t_5$, after a long unacceptable delay.

Figure 13:
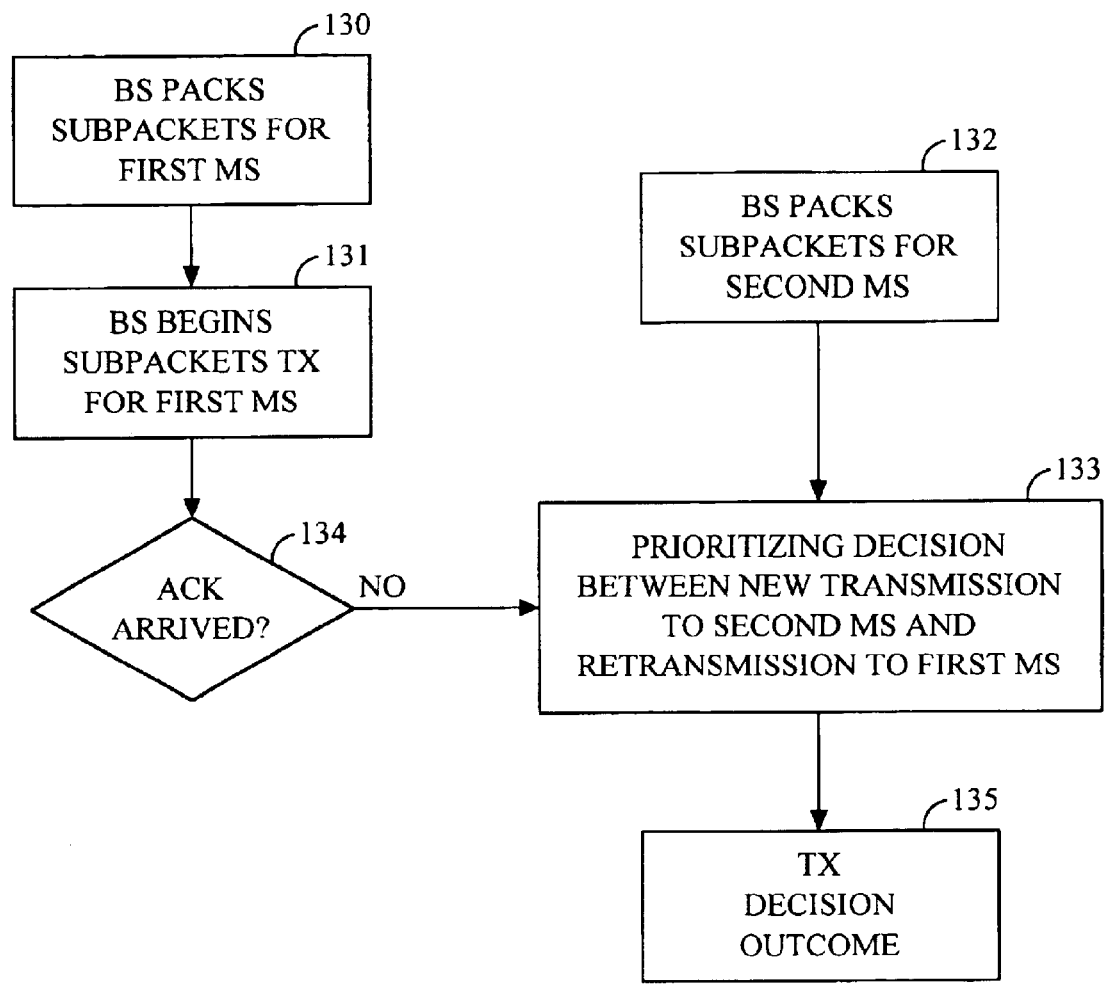
FIG. 13 is a flowchart illustrating an exemplary embodiment, wherein transmission timing priorities are set between new transmissions and retransmissions.

The sixth exemplary embodiment for transmitting data traffic uses the scheduler unit of the base station to set priorities between retransmissions to a current station and new transmissions to a new station. FIG. 13 illustrates a sixth exemplary embodiment. At step 130, a base station receives data traffic payload for transmission to a first remote station and repackages the data traffic payload into redundant subpackets. At step 131, the base station transmits at least one subpacket to the first remote station at a time where the first remote station will receive a strong signal. At step 132, the base station receives data traffic payload for transmission to a second remote station and repackages the data traffic payload into redundant subpackets. At step 133, the base station determines whether to begin transmissions to the second remote station or to retransmit to the first remote station if an acknowledgement has not arrived at step 134. At this step, a scheduler unit in the base station assigns a relative weight of importance to the transmissions to the second remote station and the retransmissions to the first remote station at a point x(t). If a long delay has occurred at x(t) since the transmissions to the first remote station, at step 135, the base station retransmits to the first remote station rather than send a new transmission to the second remote station.

In this manner, the base station may reset transmission priorities in order to reduce perceptual transmission delays to the user. Retransmissions to remote stations can be scheduled to occur at times well below the threshold energy levels set for channel sensitive transmission schemes.

Thus, a novel and improved method and apparatus for transmitting data traffic using channel state information have been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. A method for transmitting data in a channel of a wireless communication system, comprising:
   packaging a data payload into a plurality of subpackets;
   sequentially transmitting a first portion of the plurality of subpackets in accordance with predetermined delays; and
   sequentially transmitting a second portion of the plurality of subpackets at a peak of a Rayleigh fading envelope, wherein the peak is determined through a threshold value.

2. The method of claim 1, wherein each subpacket of the second portion of the plurality of subpackets have a different size from the subpackets in the first portion.

3. A method for transmitting data in a channel of a wireless communication system, comprising:
   packaging a data payload into a plurality of subpackets;
   sequentially transmitting a first portion of the plurality of subpackets in accordance with channel conditions; and
   sequentially transmitting a second portion of the plurality of subpackets at a peak of a Rayleigh fading envelope, wherein the peak is determined through a threshold value.

4. The method of claim 3, wherein each subpacket of the second portion of the plurality of subpackets have a different size from the subpackets in the first portion.

5. Apparatus for transmitting data in a channel of a wireless communication system, comprising:
   means for packaging a data payload into a plurality of subpackets;
   means for deciding whether to sequentially transmit a first portion of the plurality of subpackets in accordance with predetermined delays or sequentially transmit a second portion of the plurality of subpackets in accordance with channel conditions, wherein the means for deciding uses a Rayleigh fading envelope to decide whether channel conditions are favorable, wherein the channel conditions are favorable if the Rayleigh fading envelope is above a predetermined threshold.

6. The apparatus of claim 5, wherein each subpacket of the second portion of the plurality of subpackets have a different size from the subpackets in the first portion.

7. Apparatus for transmitting data in a channel of a wireless communication system, comprising:
   means for packaging a data payload into a plurality of subpackets;
   means for deciding whether to sequentially transmit a first portion of the plurality of subpackets in accordance with channel conditions or sequentially transmit a second portion of the plurality of subpackets in accordance with predetermined delays, wherein the means for deciding uses a Rayleigh fading envelope to decide whether channel conditions are favorable, wherein the channel conditions are favorable if the Rayleigh fading envelope is above a predetermined threshold.

8. The apparatus of claim 7, wherein each subpacket of the second portion of the plurality of subpackets have a different size from the subpackets in the first portion.

* * * * *